(12) United States Patent
Sattler et al.

(10) Patent No.: US 7,506,903 B2
(45) Date of Patent: Mar. 24, 2009

(54) LOCK, IN PARTICULAR FOR A MOTOR VEHICLE

(75) Inventors: Steffen Sattler, Munich (DE); Jaroslaw Gabrycki, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/802,901

(22) Filed: May 25, 2007

(65) Prior Publication Data

US 2007/0295042 A1  Dec. 27, 2007

Related U.S. Application Data

(63) Continuation of application No. PCT/EP2005/011614, filed on Oct. 29, 2005.

(30) Foreign Application Priority Data

Nov. 27, 2004  (DE) ...................... 10 2004 057 338

(51) Int. Cl.
   *E05C 3/06* (2006.01)
(52) U.S. Cl. .................. 292/216; 297/378.12
(58) Field of Classification Search ............ 297/378.12;
   292/DIG. 14, 116, 118, 120, 121, 123, 124,
   292/125, 126
   See application file for complete search history.

(56) References Cited

U.S. PATENT DOCUMENTS

| 2,698,197 | A | * | 12/1954 | Jacobson | 292/336 |
| 4,063,766 | A | * | 12/1977 | Granberg | 292/336 |
| 4,358,878 | A | * | 11/1982 | Seel | 24/645 |
| 5,566,991 | A | * | 10/1996 | Young | 292/201 |
| 7,032,939 | B2 | * | 4/2006 | Magnusson | 292/333 |
| 2004/0195843 | A1 | * | 10/2004 | Rotondi et al. | 292/121 |

FOREIGN PATENT DOCUMENTS

| DE | 94 09 203 U1 | 10/1995 |
| DE | 44 44 122 C1 | 4/1996 |
| DE | 197 13 753 A1 | 10/1998 |
| DE | 100 61 719 A1 | 10/2001 |
| DE | 102 14 691 A1 | 10/2003 |

OTHER PUBLICATIONS

International Search Report dated Apr. 4, 2006 and Form PCT/ISA/237 w/English translation of pertinent portions (thirteen (13) pages).
German Search Report dated Jun. 15, 2005 w/English translation of pertinent portion (eight (8) pages).

* cited by examiner

*Primary Examiner*—Gary Estremsky
(74) *Attorney, Agent, or Firm*—Crowell & Moring LLP

(57) ABSTRACT

A lock for a motor vehicle is described. The lock includes a lock latch which is displaced upon closing of the lock by a closing element from an open position in the direction of a closed position. A spring element loads the lock latch in its closed position, which is fixed in its open position in a frictional and/or formfitting way by a removable open-position retention part. Upon closing of the lock, the closing element or another component detaches the open-position retention part from the lock latch.

18 Claims, 2 Drawing Sheets

LOCK, IN PARTICULAR FOR A MOTOR VEHICLE

CROSS REFERENCE TO RELATED APPLICATIONS

This application is a continuation of PCT International Application No. PCT/EP2005/011614, filed Oct. 29, 2005, which claims priority under 35 U.S.C. § 119 to German Patent Application No. 10 2004 057 338.7 filed Nov. 27, 2004, the entire disclosures of which are herein expressly incorporated by reference.

BACKGROUND AND SUMMARY OF THE INVENTION

The present invention relates to a lock, in particular for a motor vehicle, having a lock latch as a closing element displaced upon closing of the lock from an open position to a closed position.

A conventional lock is provided for locking a foldable backrest of a motor vehicle backseat as described in German Patent Document DE 197 13 753 A1. The lock, which is kinematically coupled to a display via a coupling element, is to be unlocked via a displaceable actuating button. Upon displacement of the actuating button into an unlocking position which opens the lock, the display reaches a visible position in which it is to be seen from the display that the backrest is not locked or is not completely locked. If the display is in a non-visible position, the lock must be locked. However, when the display is not visible, it is not to be precluded that the lock is not locked.

The present invention provides a lock having a lock latch which is displaced upon closing of the lock, which easily allows reliable closing of the lock.

Various advantages of the invention are achieved by the features described herein. Advantageous embodiments of the present invention are set forth in the following specification and claims.

In its open position, the lock latch is fixed in a frictional and/or formfitting way by a removable open-position retention part. In addition, the lock latch is loaded in its closed position by a spring element. Upon displacement of a part fixable by the lock in a predefined position into the predefined position, for example, upon displacement of a backrest of a motor vehicle backseat into an upright normal position, the closing element or another component, by interaction with the lock latch and/or with the open-position retention part, causes the lock latch to be detached from the open-position retention part. Subsequently, the lock latch may independently displace itself into its closed position, in which the lock latch is fixed by the closed-position retention part, by the pre-tension force of the spring element and/or by the closing element acting on the lock latch. In an especially simple embodiment of the lock, the closed-position retention part is formed by the spring element, which, in the closed position, causes a sufficient retention force or a sufficient retention torque on the lock latch in the direction of the closed position and thus prevents the closing element from being able to detach from the lock latch. The lock latch may be a simple rotating latch, which has a leg implemented as a catch hook, for example, which engages behind the closing element and thus fixes it when the lock is closed. The closed position of the lock latch is indicated by a display device in an advantageous embodiment of the present invention, which may be activated especially simply by the lock latch. The display device may have a spring-loaded bolt, which is axially displaceable as a function of the position of the lock latch and indicates in a visible axial position whether the lock is closed and thus the closing element is fixed by the lock latch.

Other objects, advantages and novel features of the present invention will become apparent from the following detailed description of the invention when considered in conjunction with the accompanying drawings.

BRIEF DESCRIPTION OF THE DRAWINGS

An exemplary embodiment of the present invention is explained in greater detail on the basis of the following drawings.

DETAILED DESCRIPTION OF THE DRAWINGS

Figure 1:
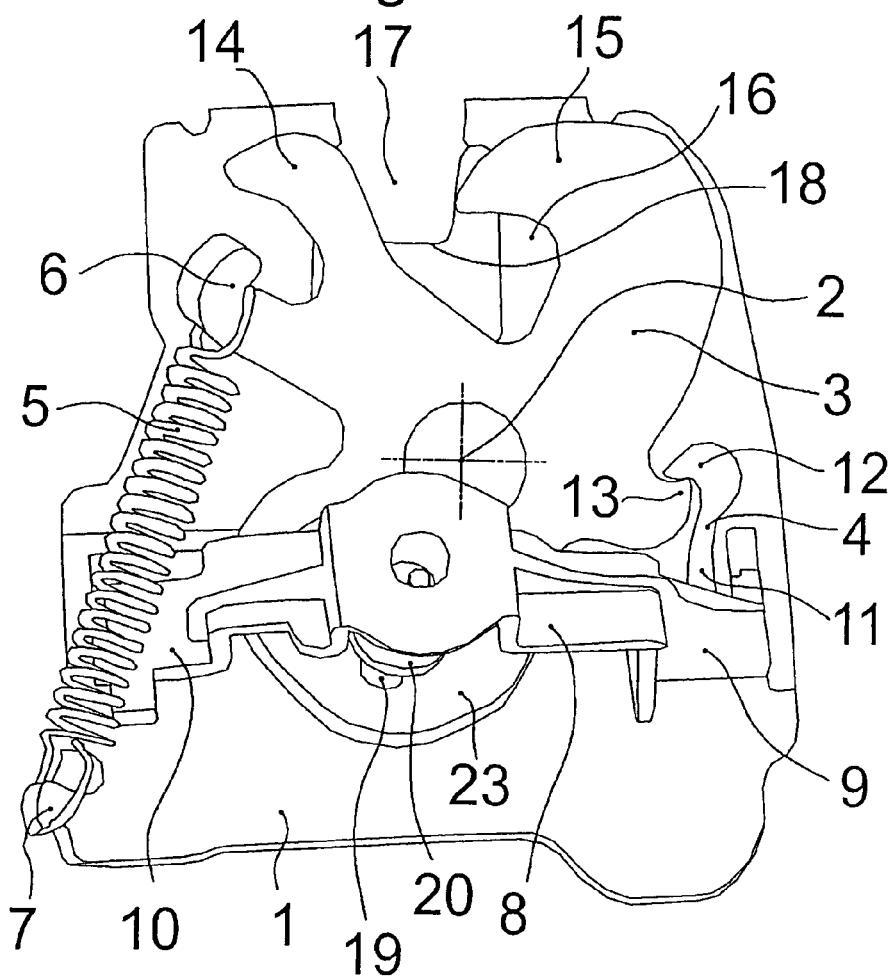
FIG. 1 shows a top view of a lock, according to an embodiment of the invention, in which the rotating latch is in its open position.

The lock according to one embodiment illustrated in FIG. 1 is provided, for example, for fixing a lateral upper area of the backrest of a backseat situated in the rear area of a motor vehicle in relation to the vehicle body of the motor vehicle. After the backrest is fastened via the locks in the upper backrest area, the backrest may be pivoted downward into an upright usage position around a pivot axis formed by the two lateral locks, in which the backrest is screwed together in its central lower area at one or more points with the vehicle body of the motor vehicle or with a seat part of the backseat.

The exemplary lock has a lock plate 1, which is attached in the upper lateral area of the backrest and mounts a rotating latch 3 so it is pivotable around an axis 2. In FIG. 1, the rotating latch 3 is in its open position, in which it is fixed by an open-position retention part implemented, for example, as a pawl 4. The rotating latch 3 is loaded by a spring element 5, implemented for example, as a traction spring counterclockwise around the axis 2 in the closed position illustrated in FIG. 3. For this purpose, the spring element 5 is attached at one front area on a lever arm 6 of the rotating latch 3 and at the other front area on a support arm 7 of the lock plate 1.

The pawl 4 may be manufactured from plastic in one piece with a bow element 8, which is removably or irremovably connected to the lock plate 1 on its lateral areas 9, 10 for example, via clip or hung connections.

The pawl 4 has a base area connected to the lateral area 9 of the bow element 8, which is connected via an elastic area 11 to a lug 12. When the rotating latch 3 is pivoted into its open position illustrated in FIG. 1, the elastic area 11 of the pawl 4 is elastically deformed in such a way that the lug 12 of the pawl 4 automatically drops in front of a notch 13 of the rotating latch 3, in the open position of the rotating latch 3, and thus prevents a displacement back in the direction of the closed position illustrated in FIG. 3.

The rotating latch 3 may be produced, in one exemplary embodiment, as a forked latch having a contact leg 14 and a leg implemented as a catch hook 15, a recess 16 being formed between the contact leg 14 and the catch hook 15.

If the backrest (not shown), is pivoted into its upright normal position, a closing bolt (not shown), closing element or the like situated laterally on the vehicle body comes to rest on the contact leg 14 and causes a torque on the rotating latch 3 counterclockwise, around the axis 2. If the backrest is displaced with a sufficient swing or a sufficient force into the upright normal position, the lug 12 of the pawl 4 disengages from the notch 13 of the rotating latch 3. Due to the tension force of the spring element 5, or additionally due to the closing element also acting on the contact leg 14, the rotating latch 3 pivots into its closed position shown in FIG. 3. In the closed position, the closing element enters the recess 16 of the rotating latch 3 and the catch hook 15 engages behind it in such a way that the closing element may not disengage from the catch hook 15. The closing element (not shown) may have an axial extension such that it may not enter the recess 16 of the lock latch 3, unless an edge recess 17 is implemented in the lock plate 1, which is penetrated by the closing element. An elastic element 18 may be fastened on the bottom of the edge recess 17, on which the closing element is elastically supported in the closed position of the rotating latch 3 and by which the closing element is loaded against the interior of the catch hook 15.

In one embodiment of the invention, in order that the closed position of the catch hook 3 may be uniquely recognized, a display device is provided which indicates whether the rotating latch is in its open position or in its closed position.

Figure 2:
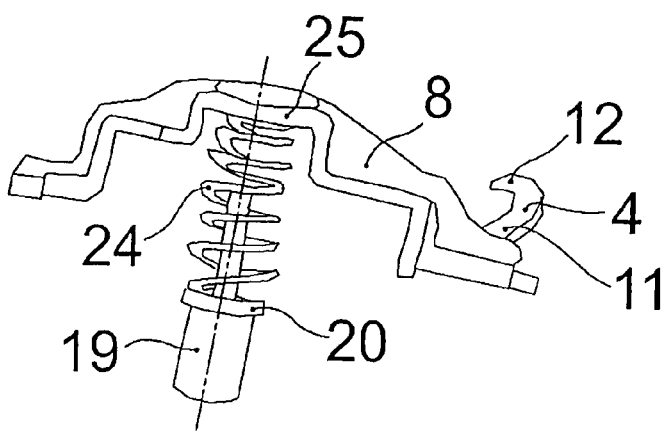
FIG. 2 shows a perspective view of the display device according to an embodiment of the invention.

An exemplary display device is shown separately in FIG. 2. It has a bolt 19 having a radially expanded head part 20, which, in the open position of the rotating latch 3, presses against a through opening 22, which is implemented in an area 23 of the rotating latch 3, under the force of a spring part 24 on an edge area 21. The bolt 19 may project into the through opening 22 or may penetrate the through opening 22. The exemplary spring part 24 is supported on the bottom 25 of a depression in the bow element 8 on its front area facing away from the head part 20 and may be manufactured from plastic in one piece with the bow element 8 and the bolt 19 as well as with its head part 20.

Figure 3:
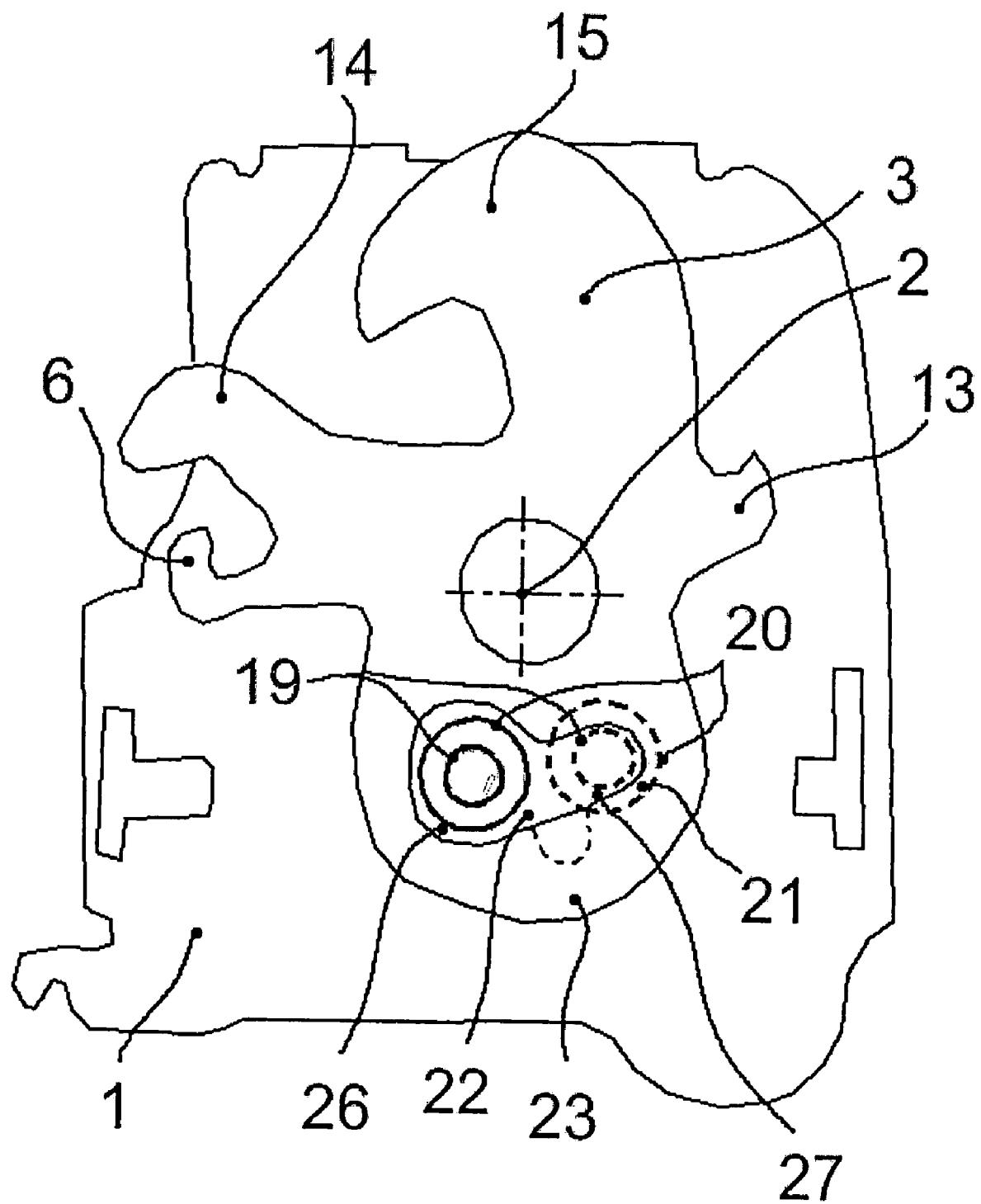
FIG. 3 shows a top view of the rotating latch, according to an embodiment of the invention, pivoted into the closed position, after the removal of the display device and the spring element.

The function of the display device is described with reference to FIG. 3. The through opening 22, which has an expansion area 26 having a larger diameter than the head part 20 of the bolt 19 and a niche area 27 smaller in diameter than the head part 20, is implemented in the area 23 of the rotating latch 3 which is opposite the catch hook 15, approximately radially to the axis 2. When the rotating latch 3 is displaced into the open position, the bolt 19 is displaced against the force of the spring part 24 in the direction toward the bottom 25 of the bow element 8. In addition, the head part 20 presses axially under the tension force of the spring part 24 against the edge area surrounding the niche area 27 of the through opening 22, and the bolt 19 penetrates the niche area 27 of the through opening 22. In FIG. 3, the relative position of the bolt 19 and its radially expanded head part 20, when the rotating latch 3 is in its open position (not shown) and the bolt 19 penetrates the niche area 27 of the through opening 22, are illustrated by dashed lines.

If the rotating latch 3, in cooperation with the closing element (not shown) and/or due to the tension force of the spring element 5, is displaced from the open position shown in FIG. 1 into the closed position shown in FIG. 3, the bolt 19, which is essentially axially displaceable on the bow element 8, reaches the expansion area 26 with its head part 20, in which the head part 20 may no longer be axially supported on the rotating latch 3. The spring part 24 may now relax and presses the head 19 using its head part 20 through the expansion area 26 outward into a display position. It is then recognizable from the projecting bolt 19 that the rotating latch 3 is in its closed position and—after the rotating latch 3 may only be displaced in cooperation with the closing element into the closed position—reliably fixes the closing element and the backrest connected thereto as intended. This is especially advantageous in the assembly of the backrest, because after a displacement of the bolt 19 into the visibly projecting display position, it is no longer necessary to be checked by a worker whether the backrest has been properly locked by the lock.

The closed-position retention part formed in the exemplary embodiment by a spring element may also be formed by another part, for example, by another spring element or by a pawl, which may fall in front of a notch or a support shoulder on the lock latch in the closed position to lock it. The lock latch may be a rotating latch as in the exemplary embodiment or another pivotable lock latch or a lock latch displaceable on a linear or curved path. The display device may also be formed by another display device which indicates the closed position of the rotating latch by the position of a display element and/or by a visual and/or acoustic signal. In the exemplary embodiment, the lock is closed during the assembly of the backrest of a motor vehicle backseat and then no longer opened, or may be only opened in case of repair. In this case, the lock replaces another attachment of the backrest using screws, for example. In order that the lock used in the exemplary embodiment may be opened again, there may be provided a lever arm or a force attack face on the rotating latch, via which the rotating latch may be returned into its open position manually or using a tool, for example, in which the pawl automatically falls in front of the notch on the rotating latch and fixes the rotating latch in its open position. The lock may also be opened and closed again later arbitrarily often.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A lock for a motor vehicle, comprising:
   a lock latch displaceable upon closing of the lock by a closing element from an open position to a closed position;
   a spring element for urging the lock latch in the closed position; and
   a disengageable open-position retention element for retaining the lock latch in the open position in at least one of a frictional and formfitting manner;
   wherein, upon closing of the lock, the closing element disengages the open position retention element from the lock latch;
   a display device for indicating whether the lock latch is in the open position or in the closed position with a bolt having a radially expanded head part, which, in the open position of the lock latch presses against an edge area of a through opening on a portion of the lock latch, and is urged against the portion by a spring part, the bolt projecting into the through opening.

2. The lock according to claim 1, wherein the lock latch comprises a rotating latch pivotable around a pivot axis, having a leg implemented as a catch hook, the catch hook regionally enclosing the closing element in the closed position of the rotating latch to prevent disengagement of the closing element from the catch hook.

3. The lock according to claim 1, wherein the lock latch is fixed in the closed position by a closed-position retention element.

4. The lock according to claim 3, wherein the closed-position retention element is formed by the spring element.

5. The lock according to claim 1, wherein the open-position retention element comprises a pawl having a lug, which, in the open position, is elastically urged in front of a notch formed on the lock latch.

6. The lock according to claim 5, wherein the pawl comprises a fixed base area connected via an elastic area to the lug, which, when the lock latch is in the open position, is elastically deformed to urge the lug of the pawl toward the lock latch.

7. The lock according to claim 1, wherein the through opening comprises an expansion area larger in diameter than the head part of the bolt, opposite the head part when the lock latch is displaced into the closed position, the head part being displaceable by the spring part through the expansion area thus placing the bolt of the display device in a displaced position indicating whether lock latch is in the closed position.

8. The lock according to claim 1, wherein the lock latch is pivotally attached to one of a lock plate and a wall area.

9. The lock according to claim 1, wherein the spring part is supported at one front area on the head part and at another front area on a bow element, which is one of permanently and removably connectable to one of a wall area and the lock plate.

10. The lock according to claim 9, wherein at least one of the bow element, the spring part, the bolt having the head part and the open-position retention part are manufactured from plastic in one piece.

11. A lock for a motor vehicle, comprising:
a lock latch displaceable upon closing of the lock by a closing element from an open position to a closed position;
a spring element for urging the lock latch in the closed position; and
a disengageable open-position retention element for retaining the lock latch in the open position in at least one of a frictional and formfitting manner;
wherein, upon closing of the lock, the closing element disengages the open position retention element from the lock latch, and
wherein an edge recess is formed on a lock plate to which is pivotally attached the lock latch, which is penetrated by the closing element upon closing of the lock, and an elastic element is attached on the bottom of the edge recess, on which the closing element is elastically supported in the closed position of the rotating latch, and by which the closing element is urged against an interior portion of the catch hook.

12. A motor vehicle lock, comprising:
a lock latch rotatably disposed on a lock plate, movable between an open position and a closing position;
an elastic element urging the lock latch in the closing position;
an open position retention part for releasably retaining the lock latch in the open position, and releasing the lock latch when a rotation of the lock latch imparted by a closing element overcomes a resilience of the open position retention part;
a separate display device operatively connected to the lock latch to visually indicate the open and the closing position of the lock latch; and
a bolt having a radially expanded head part, which, in the open position of the lock latch presses against an edge area of a through opening on a portion of the lock latch, and is urged against the portion by a spring part, the bolt projecting into the through opening.

13. The motor vehicle lock according to claim 12, wherein the spring part of the display device is for urging the bolt in a visible configuration when the lock latch is in the closed position.

14. The motor vehicle lock according to claim 13, wherein the through opening defined by the portion of the lock latch has a niche area preventing passage therethrough of the bolt into the visible configuration when the lock latch is in the open position.

15. The motor vehicle lock according to claim 13, wherein the through opening defined by the portion of the lock latch has an expansion area permitting passage therethrough of the bolt into the visible configuration when the lock latch is in the closed configuration.

16. The motor vehicle lock according to claim 12, wherein the open position retention part comprises a flexible portion connected to a lug, the flexible portion urging the lug in engagement with a corresponding notch of the lock latch.

17. The motor vehicle lock according to claim 12, wherein the lock latch is pivotally mounted on a lock plate.

18. The motor vehicle lock according to claim 17, further comprising an elastic element of the lock plate for urging the closing element in contact with a catch hook of the lock latch.

* * * * *